(12) United States Patent
Zaitsu et al.

(10) Patent No.: US 9,276,501 B2
(45) Date of Patent: Mar. 1, 2016

(54) ELECTROMECHANICAL TRANSDUCER AND PRODUCTION METHOD THEREFOR

(71) Applicant: CANON KABUSHIKI KAISHA, Tokyo (JP)

(72) Inventors: Yoshitaka Zaitsu, Ichikawa (JP); Takehiko Kawasaki, Kamakura (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 77 days.

(21) Appl. No.: 13/874,888

(22) Filed: May 1, 2013

(65) Prior Publication Data
US 2014/0203682 A1    Jul. 24, 2014

Related U.S. Application Data

(63) Continuation of application No. 13/141,488, filed as application No. PCT/JP2009/006852 on Dec. 14, 2009, now Pat. No. 8,455,964.

(30) Foreign Application Priority Data

Dec. 25, 2008    (JP) .................................. 2008-330366

(51) Int. Cl.
*H02N 1/00*    (2006.01)
*B06B 1/02*    (2006.01)
*B06B 3/00*    (2006.01)

(52) U.S. Cl.
CPC ................ *H02N 1/00* (2013.01); *B06B 1/0292* (2013.01); *B06B 3/00* (2013.01); *Y10T 29/49005* (2015.01); *Y10T 29/49009* (2015.01)

(58) Field of Classification Search
CPC ........... H02N 1/00; B06B 1/0292; B06B 3/00
See application file for complete search history.

(56) References Cited

U.S. PATENT DOCUMENTS 8,455,964 B2 *   6/2013   Zaitsu et al. .................. 257/419

FOREIGN PATENT DOCUMENTS

JP    2006/516368 A    6/2006
WO   2008/136198 A1   11/2008

* cited by examiner

*Primary Examiner* — Long Pham
(74) *Attorney, Agent, or Firm* — Canon USA, Inc. IP Division

(57) ABSTRACT

An electromechanical transducer includes a plurality cells that are electrically connected to form a unit. Each of the cells includes a first electrode and a second electrode provided with a gap being disposed therebetween. Dummy cells that are not electrically connected to the cells are provided around the outer periphery of the unit of the cells.

14 Claims, 12 Drawing Sheets

ELECTROMECHANICAL TRANSDUCER AND PRODUCTION METHOD THEREFOR

CROSS-REFERENCE TO RELATED APPLICATION

This application is a Continuation of co-pending U.S. patent application Ser. No. 13/141,488 filed Jun. 22, 2011, which is a National Phase application of International Application No. PCT/JP2009/006852, filed Dec. 14, 2009, which claims the benefit of Japanese Patent Application No. 2008-330366, filed Dec. 25, 2008. The disclosures of the above-named applications are hereby incorporated by reference herein in their entirety.

TECHNICAL FIELD

The present invention relates to an electromechanical transducer and a production method therefor.

BACKGROUND ART

In recent years, electromechanical transducers produced by a micromachining process have been researched actively. In particular, capacitive electromechanical transducers called CMUT (Capacitive Micromachined Ultrasonic Transducers) have attracted attention, because they can transmit and receive ultrasonic waves with a lightweight vibrating membrane, and can more easily obtain wide band characteristics even in the liquid and air than piezoelectric electromechanical transducers that have been used hitherto.

The structure of a CMUT will be described below. A CMUT includes a plurality of elements arranged in an array in a one-dimensional or two-dimensional direction. These elements serve to transmit or receive ultrasonic waves.

The structure of an element in the CMUT will be described below. As shown in FIG. 11A, an element 301 of a CMUT includes a plurality of cells 311. By simultaneously applying driving voltage signals of the cells 311 in the element 301, ultrasonic waves are output from the element 301. Further, ultrasonic detection signals received by the cells 311 in the element 301 are added by upper electrodes 315 and lower electrodes (not shown) that are common to the cells 311, and the sum of the signals serves as an ultrasonic detection signal received by the element 301. Lines 307 electrically connect the upper electrodes 315 of the cells 311.

U.S. Pat. No. 6,958,255 discloses an example of a CMUT having such an element structure. In the CMUT disclosed in U.S. Pat. No. 6,958,255, a substrate through line 304 is provided in a support substrate 305, as shown in FIG. 11B. The substrate through line 304 electrically connects a circuit board 303 and a lower electrode 316. In the circuit board 303, driving voltage signals are generated to output an ultrasonic wave from an element, and signal processing, such as amplification and delay addition, is conducted on an ultrasonic signal generated by an ultrasonic wave received by the element.

The structure and operation principle of the cell of the CMUT will be described below. As shown in FIG. 12A, a cell 311 of the CMUT includes a membrane 312, an insulating layer 313, a cavity 314, an upper electrode 315, and a lower electrode 316. The upper electrode 315 and the lower electrode 316 constitute a capacitor, and a bias voltage is applied therebetween by a bias voltage source 317. For transmission of an ultrasonic wave, a driving voltage signal having a proper waveform is applied between the upper and lower electrodes 315 and 316 by a driving voltage signal source 318, whereby the membrane 312 vibrates to generate an ultrasonic wave in accordance with the driving voltage signal, as shown in FIG. 12A. Conversely, for receiving, the membrane 312 is vibrated by an ultrasonic wave reaching the CMUT, whereby an electrostatic capacitance between the upper and lower electrodes 315 and 316 changes and a current signal is generated in accordance with the ultrasonic wave, as shown in FIG. 12B. By detecting this current signal with a current detector 319, the received ultrasonic wave can be detected.

SUMMARY OF INVENTION

Unfortunately, the displacement amount of the membrane varies among the cells of the element. It can be conceived that this variation among the cells is caused by warping due to the difference in coefficient of thermal expansion between the membrane and the insulating layer and internal stresses in the membrane and the insulating layer. The variation in displacement amount among the cells is undesirable because it appears as differences in transmission efficiency and detection sensitivity for the ultrasonic wave.

In particular, to normally operate the CMUT, a phenomenon called a pull-in, in which the upper electrode is attracted to the lower electrode together with the membrane, is to be avoided. To avoid a pull-in, it is necessary to set the bias voltage so that a pull-in will not occur in a cell whose initial displacement amount is the largest. Here, the transmission efficiency and detection sensitivity of the CMUT increase as the gap between the upper and lower electrodes decreases. Since electrostatic attractive force between the upper and lower electrodes is increased by increasing the bias voltage, the transmission efficiency and detection sensitivity of the CMUT can be enhanced by increasing the bias voltage. However, when the bias voltage excessively increases, a pull-in occurs the instant that the bias voltage reaches a certain voltage, so that a desired vibration characteristic cannot be obtained. A voltage at which a pull-in occurs is referred to as a pull-in voltage. A pull-in voltage is determined by the initial displacement amount of the membrane. Thus, since the upper limit value of the bias voltage applied between the upper and lower electrodes is limited by variation in initial displacement of the membrane among the cells, the receiving sensitivity of the CMUT is limited.

The present invention provides an electromechanical transducer that reduces variation in displacement amount of a membrane among cells.

An electromechanical transducer according to an aspect of the present invention includes an element. The element includes a plurality of cells each including a first electrode and a second electrode provided with a cavity therebetween, the cells being electrically connected in parallel to form a unit; and a dummy cell provided around an outer periphery of the unit of the cells, the dummy cell not being electrically connected to the cells.

A production method according to another aspect of the present invention is for an electromechanical transducer including an element having a plurality of cells each including a first electrode and a second electrode provided with a cavity being disposed therebetween, the cells being electrically connected in parallel to form a unit. The production method includes the step of forming a dummy cell around an outer periphery of the unit of the cells, the dummy cell not being electrically connected to the cells.

According to the present invention, since variation in displacement amount of a membrane among the cells is reduced by forming dummy cells around the outer periphery of the unit of the cells, variation in receiving sensitivity among the cells can be reduced in the electromechanical transducer.

BRIEF DESCRIPTION OF DRAWINGS

FIG. 1A is a top view showing a structure of an element in a CMUT according to a first embodiment of the present invention.
FIG. 1B is a cross-sectional view taken along line IB-IB in FIG. 1A.
FIG. 2A is a top view showing another structure of an element in the CMUT according to the first embodiment.
FIG. 2B is a cross-sectional view taken along line IIB-IIB in FIG. 2A.
FIG. 3 shows a structure of an element in a CMUT according to a second embodiment of the present invention.
FIG. 4A is a top view showing a structure of an element in a CMUT according to a third embodiment.
FIG. 4B is a cross-sectional view taken along line IVB-IVB in FIG. 4A.
FIG. 5 shows a structure of an element in a CMUT according to a fourth embodiment of the present invention.
FIG. 6 shows another structure of an element in the CMUT according to the fourth embodiment.
FIG. 7A illustrates a CMUT production method according to the present invention.
FIG. 7B illustrates the CMUT production method.
FIG. 7C illustrates the CMUT production method.
FIG. 7D illustrates the CMUT production method.
FIG. 7E illustrates the CMUT production method.
FIG. 7F illustrates the CMUT production method.
FIG. 8A shows another CMUT production method according to the present invention.
FIG. 8B shows the CMUT production method.
FIG. 9A is a schematic view showing the initial displacement amount provided in a case in which a dummy cell is not provided.
FIG. 9B is a schematic view showing the initial displacement amount provided in a case in which a dummy cell is provided.
FIG. 10A is a graph showing the relationship between the depth of a cavity of a dummy cell and the difference in initial displacement of a membrane so as to show the advantages of the present invention.
FIG. 10B is a graph showing the relationship between the width of the cavity in the dummy cell and the difference in initial displacement of the membrane.
FIG. 11A is a top view showing a structure of an element in a CMUT of the related art.
FIG. 11B is a cross-sectional view showing a structure of an element in a CMUT of the related art.
FIG. 12B shows the structure and operation principle of the cell in the CMUT of the related art provided during receiving of an ultrasonic wave.

DESCRIPTION OF EMBODIMENTS

The present inventors have found, from their knowledge, that variation in initial displacement amount of a membrane among cells can be reduced by forming, around the periphery of a unit of electrically connected cells, dummy cells that are not electrically connected to the cells.

Figure 1A:
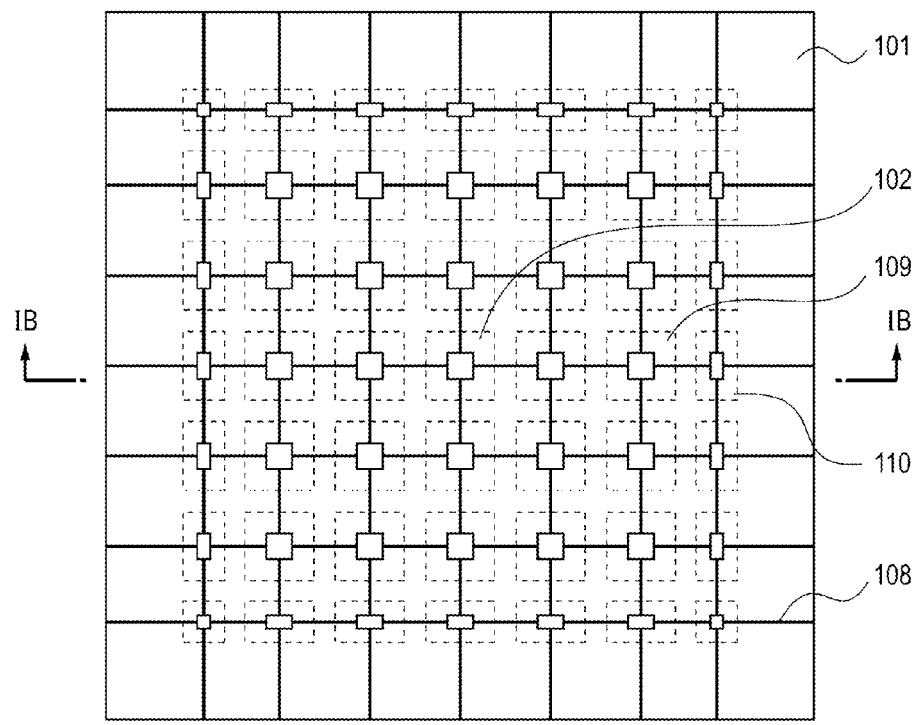
[FIG. 1A]
Figure 1B:
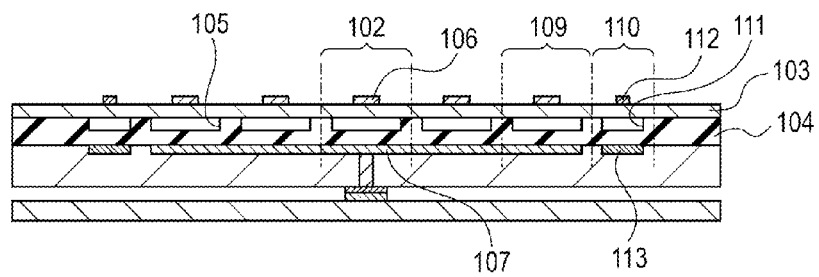
[FIG. 1B]

In the present invention, cells are provided in a plurality of rows, and are electrically connected in parallel to form a unit. In each cell, a lower electrode serving as a first electrode and an upper electrode serving as a second electrode are provided with a cavity being disposed therebetween. Further, dummy cells that are not electrically connected to the cells are provided around the periphery of the unit of electrically connected cells. The unit of cells and the dummy cells constitute an element. That is, the expression that the "dummy cells that are not electrically connected to the electrically connected cells are provided around the periphery of the unit of the cells" means that "dummy cells are provided around the peripheries of cells provided on the outermost periphery of the element, and in an arrangement manner similar to that of the cells". In FIGS. 1A and 1B, cells 109 provided on the outermost side of the element serve as "cells provided on the outermost periphery of the element", and cells 110 around the peripheries of the cells provided on the outermost periphery serve as dummy cells. Further, while the element shown in FIGS. 1A and 1B includes twenty-five cells, the electromechanical transducer of the present invention is not limited thereto, and the element may include a desired number of cells. In addition, while one element is shown in FIGS. 1A and 1B, an arbitrary number of elements can be provided in the electromechanical transducer, and a plurality of elements may be arranged in a two-dimensional array.

The term "dummy cell" refers to a structure that includes at least a membrane serving as a vibrating membrane and a cavity and that is not electrically connected to a cell (that is not used as a signal). The dummy cell may include a lower electrode serving as a first electrode and an upper electrode serving as a second electrode as long as it is not electrically connected to the cell. In other words, even when an upper electrode and a lower electrode are provided in the dummy cell of the element, it is only necessary that one of the upper electrodes and lower electrodes in the dummy cell is electrically connected to the upper electrode or the lower electrode in the cell. With this, the output from the dummy cell is electrically separated from the output from the unit of cells, and is not used as a signal.

In the present invention, the upper electrode can be formed by a film made of a choice from metal, low-resistance amorphous silicon, and a low-resistance oxide semiconductor. The membrane may also function as the upper electrode. The lower electrode can be formed of any material that has a low electrical resistance, for example, a doped single-crystal silicon substrate, a doped polycrystal silicon film, a single-crystal silicon substrate having a doped region serving as a lower electrode, a doped amorphous silicon, an oxide semiconductor, or a metal film. The substrate can also function as the lower electrode.

It is conceivable that variation in displacement amount of the membrane among the cells is reduced by the configuration of the electromechanical transducer of the present invention because, in peripheral edge portions of cells on the outermost periphery of the element, structures of the membrane and the insulating layer (e.g., the joint area between the membrane and the insulating layer) are identical or considerably close to those of the other cells. Thus, the distribution of internal stress of the membrane in the outermost cells is identical or considerably close to that of the other cells. Hence, it is conceivable that the effect of reducing variation in displacement amount of the membrane among the cells can be obtained by arranging the dummy cells.

Figure 9A:
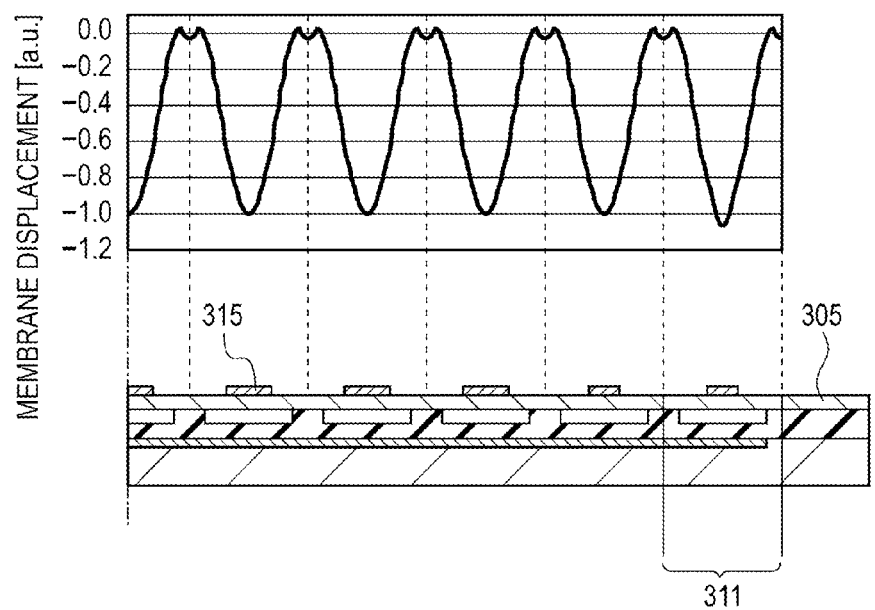
[FIG. 9A]
Figure 9B:
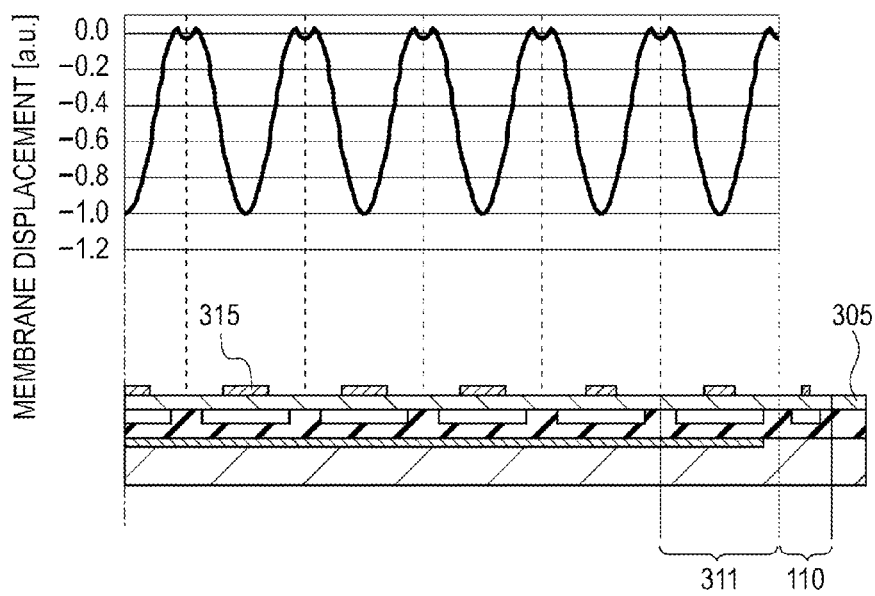
[FIG. 9B]

The following is the result of verification of the above-described effect made by calculation using a finite element method. A model of an element in which cells are arranged in line and a model in which dummy cells are provided outside end cells were prepared, and variation in initial displacement amount of the membrane due to the internal stress generated in the membrane and the insulating layer was calculated by the finite element method. FIG. 9A shows the initial displacement amount of the membrane provided when a dummy cell is not provided, and FIG. 9B shows the initial displacement amount of the membrane provided when dummy cells 110 are provided. The initial displacement amount of the membrane is the amount of displacement caused by a resultant force of the internal stress in the membrane and the pressure applied by the difference in atmospheric pressure between the interior and exterior of the cavity (about one atmospheric pressure=101325 Pa). As the internal stress to be applied, a thermal contraction stress generated by the temperature difference caused between the times before and after formation of the membrane was assumed. Analysis using the finite element method was performed by commercially available software (ANSYS 11.0 from ANSYS, Inc.). The result of analysis shows that the initial displacement amount of the cells on the outermost periphery (endmost cells) is larger than those of the other cells when a dummy cell is not provided. The analysis result also shows that the initial displacement amount is substantially equal among the cells when dummy cells are provided at the ends. Accordingly, it was verified that the variation in initial displacement amount of the membrane among the cells is reduced by forming dummy cells around the peripheries of the cells on the outermost periphery of the element.

Figure 10A:
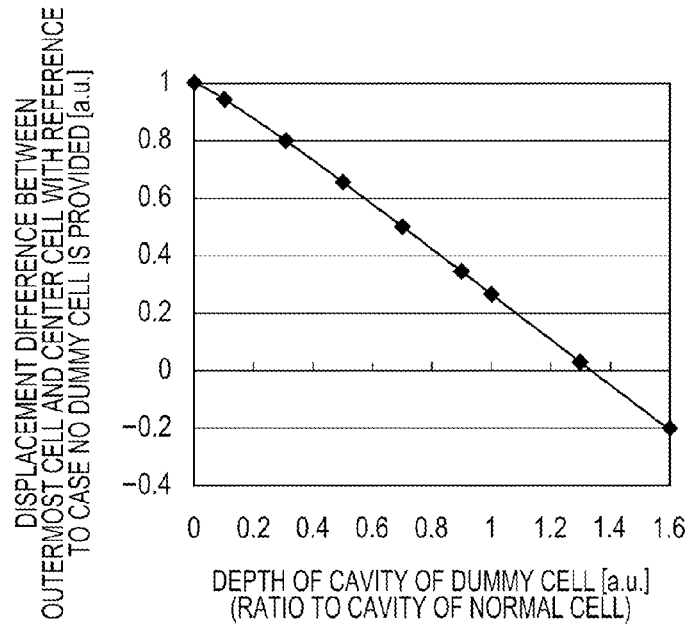
[FIG. 10A]
Figure 10B:
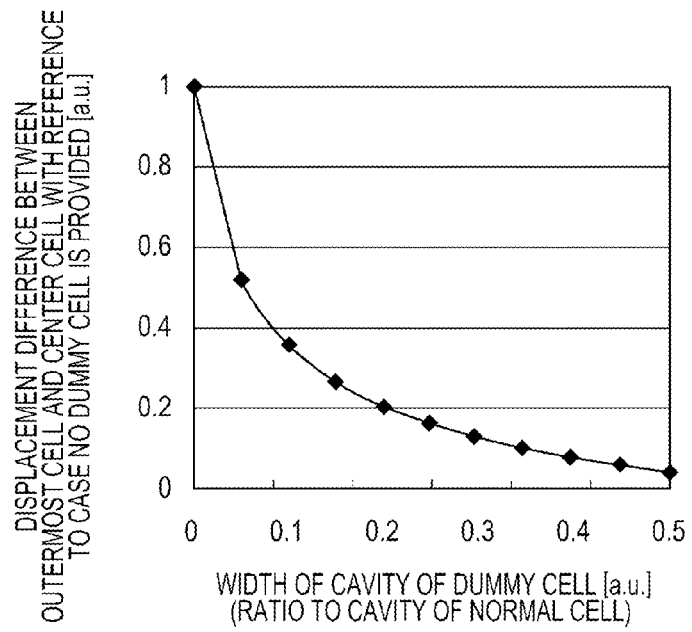
[FIG. 10B]
Figure 11A:
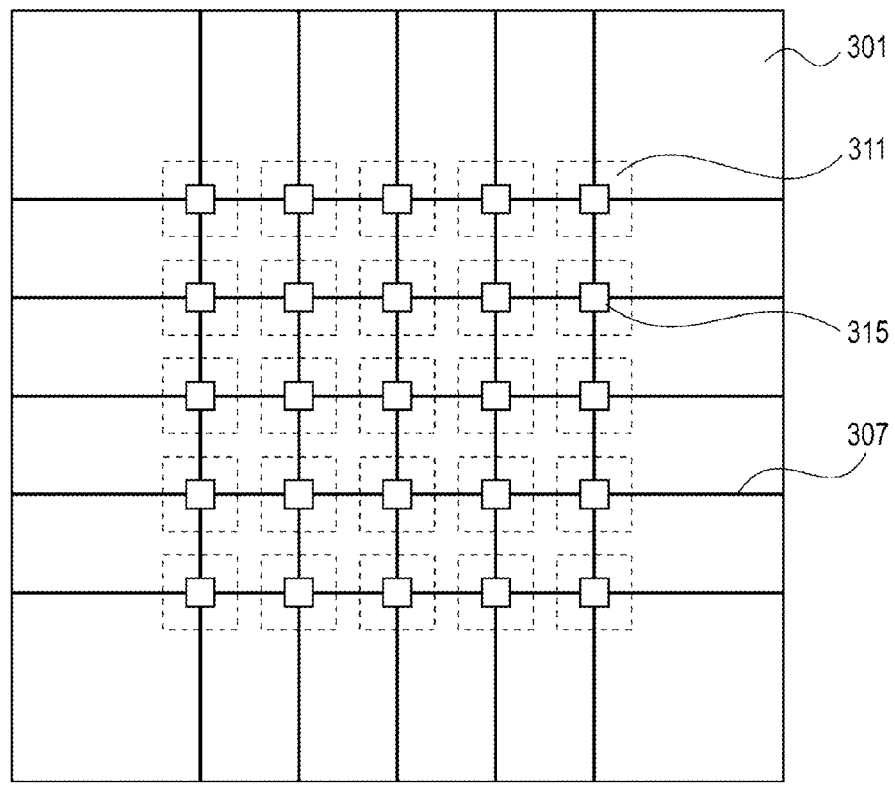
[FIG. 11A]
Figure 11B:
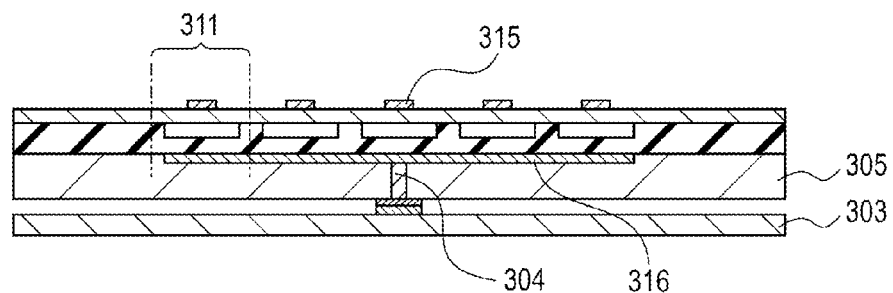
[FIG. 11B]
Figure 12A:
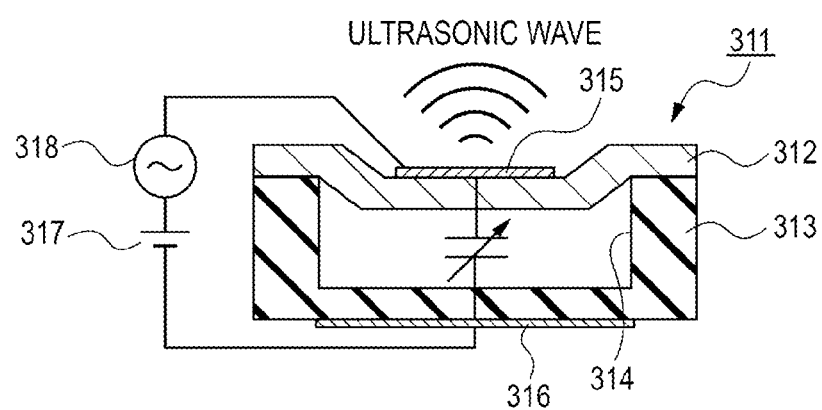
[FIG. 12A]
FIG. 12A show a structure and operation principle of a cell in the CMUT of the related art provided during transmission of an ultrasonic wave.
Figure 12B:
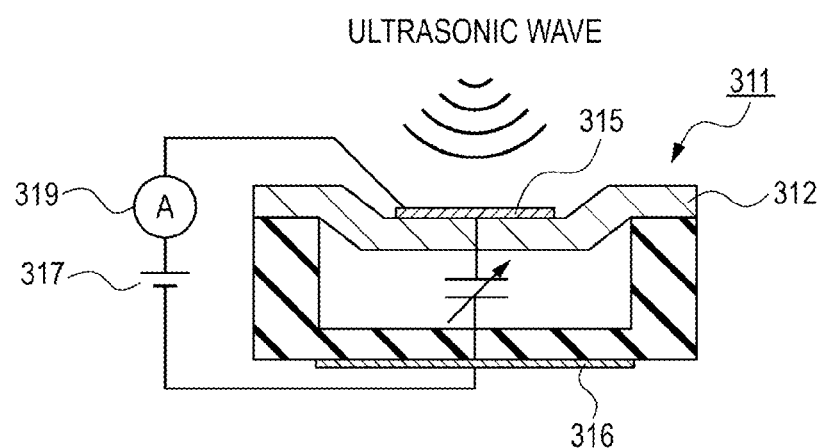
[FIG. 12B]

FIGS. 10A and 10B show the result of comparison between the initial displacement amounts of the center cell and the cell on the outermost periphery of the element. FIG. 10A shows the result provided when the depth of the cavity of the dummy cell is 0 (no dummy cell) and the difference in initial displacement amount between the center cell and the cell on the outermost periphery of the element is 1. In this case, the width of the cavity of the dummy cell is fixed in all condition. FIG. 10B shows the result provided when the width of the cavity of the dummy cell is zero (no dummy cell) and the difference in initial displacement amount between the center cell and the cell on the outermost periphery of the element is one. In this case, the depth of the cavity of the dummy cell is fixed in all conditions. Here, the width of the cavity of the dummy cell refers to the length of the cavity in a direction parallel to the plane where the cells are arranged, and the depth of the cavity refers to the length of the cavity in a direction perpendicular to the plane where the cells are arranged.

FIG. 10A shows that the difference in initial displacement amount of the membrane decreases as the depth of the dummy cell increases. Particularly when a dummy cell having a cavity deeper than that of a normal cell is used, there is a possibility that the difference in initial displacement amount of the membrane between the center cell and the cell on the outermost periphery of the element can become zero. Further, FIG. 10B shows that the difference in initial displacement amount of the membrane decreases as the width of the dummy cell increases. In particular, even when a narrow dummy cell having a width that is 40 percent of the width of the other cells is used, variation in initial displacement amount of the membrane can be reduced by 90 percent, compared with the case in which a dummy cell is not provided. In addition, even when the dummy cell has a width that is 10 percent of the width of the other cells, variation in initial displacement amount of the membrane can be reduced by 60 percent, compared with the case in which a dummy cell is not provided. Hence, to reduce the variation in initial displacement amount of the membrane, it is preferable that the width of the dummy cell be 10 percent or more of the width of the other cells, and more preferable that the width of the dummy cell be 40 percent or more of the width of the other cells.

First Embodiment

A first embodiment of the present invention will be described below. In the first embodiment, dummy cells have a width smaller than that of cells, and a depth equal to that of the cells.

Referring to FIGS. 1A and 1B, an element 101 of the first embodiment includes a plurality of cells 102 arranged in a plane. Each cell 102 includes a membrane 103, a cavity 105 provided in an insulating layer 104, an upper electrode 106, and a lower electrode 107. The upper electrode 106 and the lower electrode 107 are connected electrically. In the element 101, all the upper electrodes 105 are electrically connected by lines 108, and the lower electrodes 107 are electrically isolated from one another. Dummy cells 110 are arranged around cells 109 provided on the outermost periphery of the element 101. Similarly to the other cells, each dummy cell 110 includes a membrane 103, an insulating layer 104, a cavity 111, an upper electrode 112, and a lower electrode 113. However, to remove the influence of signals generated in the dummy cells 110, at least one of the upper electrode 112 and the lower electrode 113 is electrically isolated (not electrically connected) from the upper electrode 106 and the lower electrode 107 of the other cell. As shown in FIG. 1B, the lower electrode 113 of the dummy cell 110 is isolated from the lower electrode 107 of the other cell. That is, since the dummy cells 110 are not electrically connected to a circuit board, signals from the dummy cells 110 are not used in subsequent signal processing.

In the first embodiment, since the width of the cavities 111 of the dummy cells 110 is smaller than that of the cavities 105 of the other cells 102, it is possible to suppress the decrease in the effective area of the element, that is, the ratio of the area of the cells to the area of the element. Further, since the depth of the cavities 111 of the dummy cells 110 is equal to that of the cavities 105 of the other cells 102, the dummy cells 110 can be produced together with the other cells 102. Hence, the number of unnecessary processes is not increased.

Figure 2A:
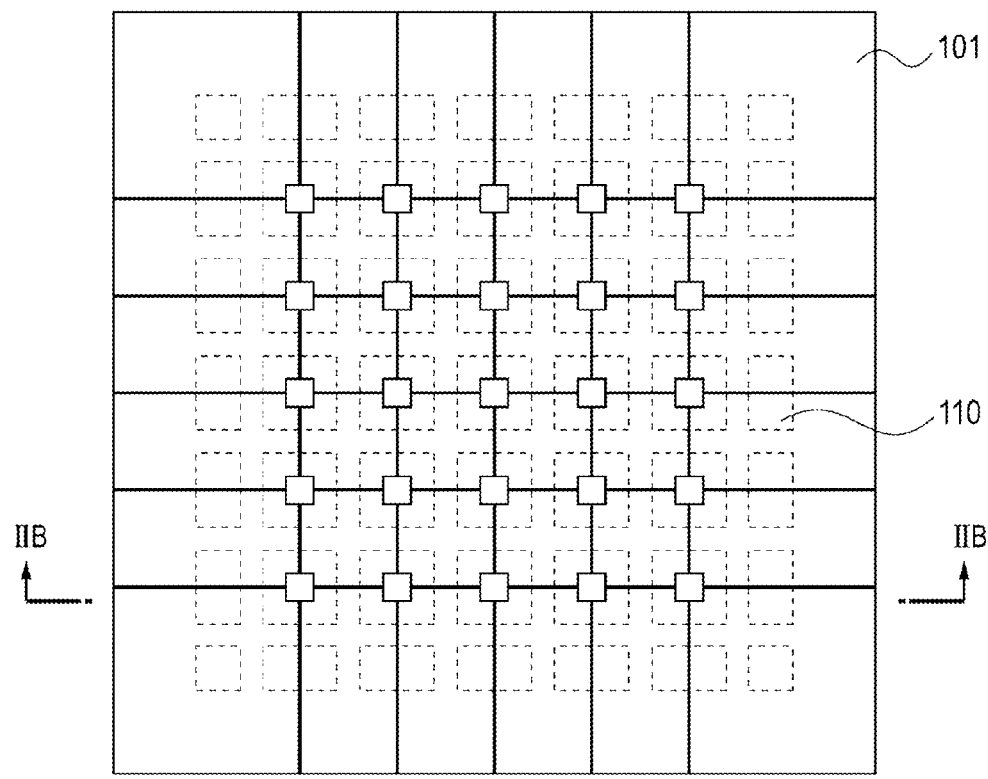
[FIG. 2A]
Figure 2B:
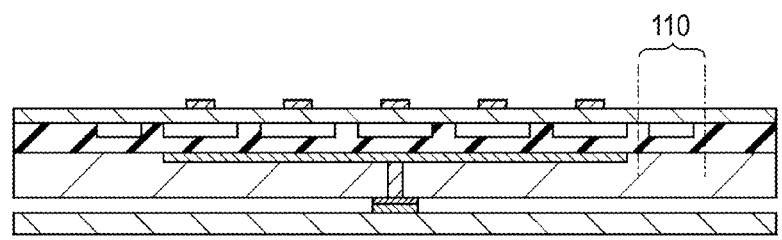
[FIG. 2B]

When the thickness of the upper electrodes 106 can be regarded as sufficiently smaller than that of the membranes 103, that is, when the rigidity of the upper electrodes 106 is regarded as sufficiently lower than that of the membranes 103, the upper electrodes 112 may be omitted from the dummy cells 110, as shown in FIGS. 2A and 2B. Similarly, when the thickness of the lower electrodes 107 can be regarded as sufficiently smaller than the thickness from the bottoms of the insulating layers 104 to the bottoms of the cavities 105, the lower electrodes 113 may be omitted from the dummy cells 110. In second and subsequent embodiments, upper and lower electrodes are not provided in dummy cells so that the arrangement of the dummy cells can be recognized easily.

Second Embodiment

A second embodiment of the present invention will be described below. In the second embodiment, the depth of cavities of dummy cells is larger than that of cells.

Figure 3:
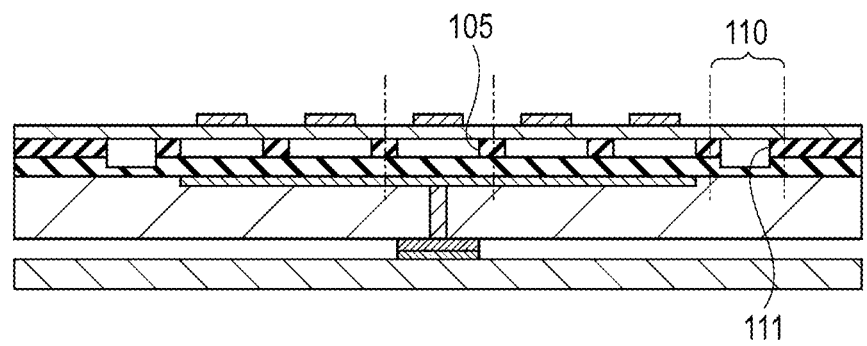
[FIG. 3]

As shown in FIG. 3, in the second embodiment, the depth of cavities 111 of dummy cells 110 is larger than that of cavities 105 of cells 102. Since this enhances the effect of the dummy cells 110 for reducing variation in initial displacement amount of the membrane, the decrease in effective area of the element can be further suppressed, compared with the above-described first embodiment.

Third Embodiment

A third embodiment of the present invention will be described below. In the third embodiment, a plurality of dummy cells are arranged from the inner peripheral side toward the outer peripheral side of the element.

Figure 4A:
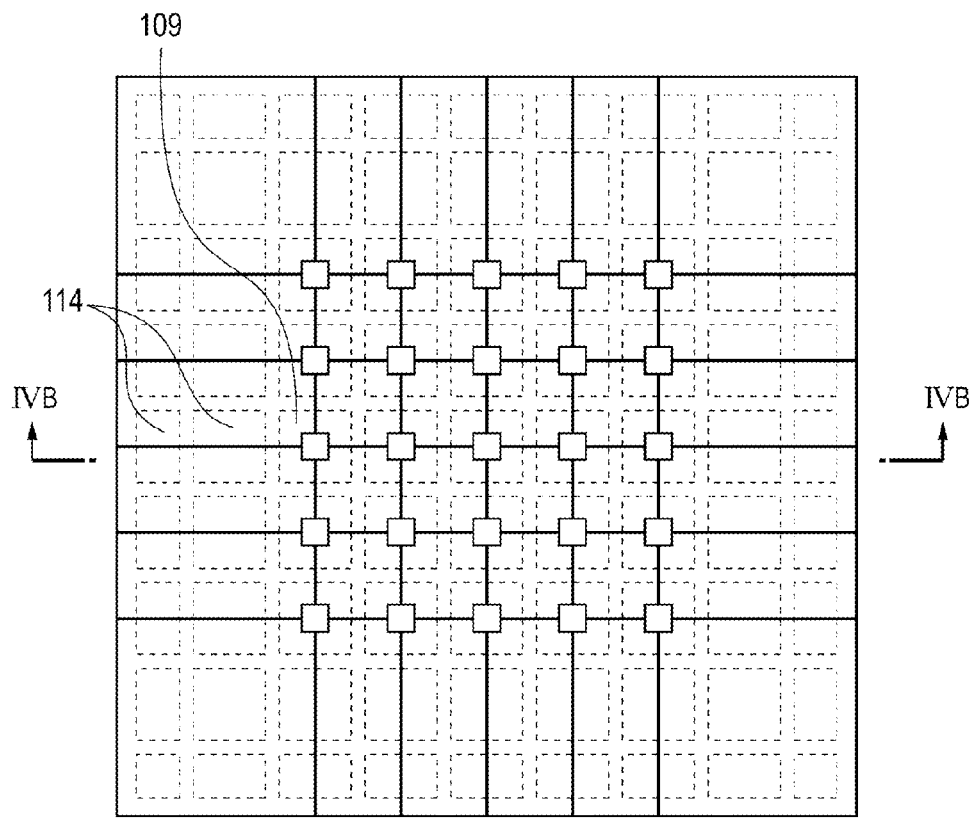
[FIG. 4A]
Figure 4B:
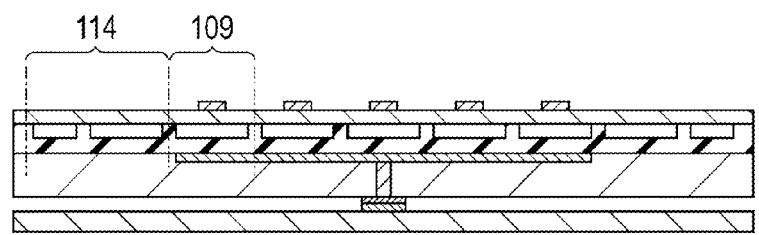
[FIG. 4B]

Referring to FIGS. 4A and 4B, two dummy cells 114 are provided outside each cell 109 provided on the outermost periphery of an element 101 on the left side of the figures, and are arranged from the inner peripheral side toward the outer peripheral side of the element 101. In this case, when dummy cells having cavities wider than those of the cells are produced, the decrease in rigidity of the membrane is suppressed, and the membrane is prevented from damage.

Fourth Embodiment

A fourth embodiment of the present invention will be described below.

Figure 5:
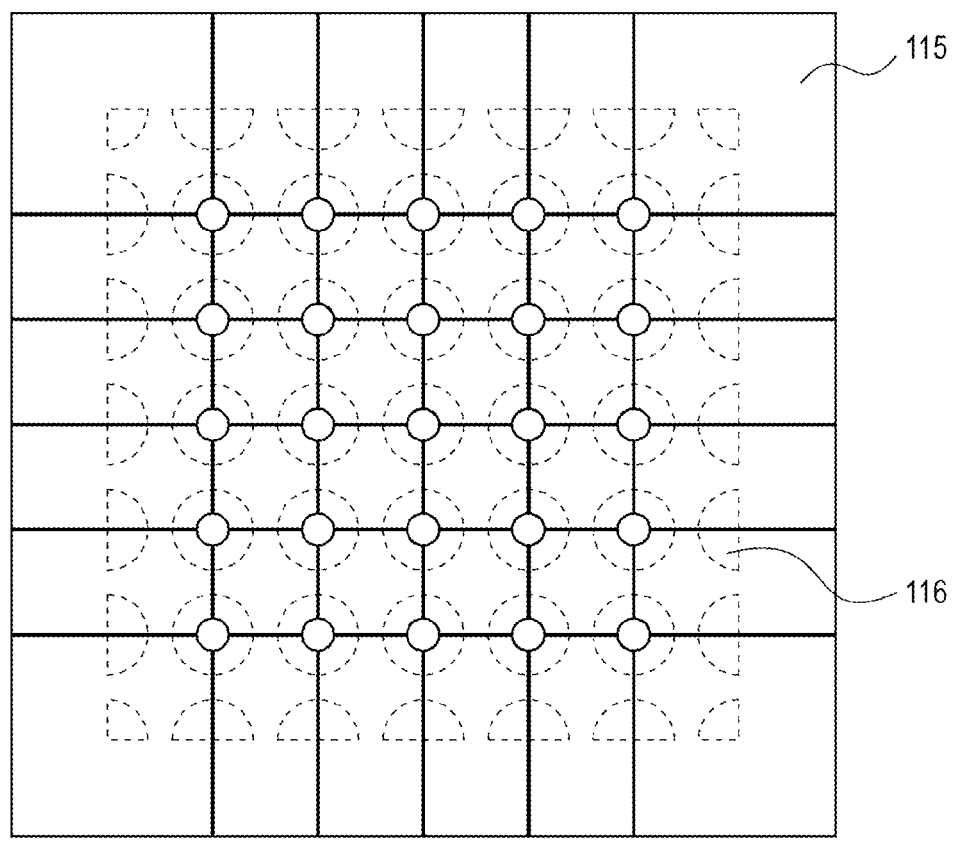
[FIG. 5]

In the fourth embodiment, the present invention is applied to an element in which cells have a shape different from the square shape (shape in the top view of the cells) and are arranged in a pattern different from a grid pattern. For example, as shown in FIG. 5, semicircular narrow dummy cells 116 are arranged in an element 115 including circular cells. Alternatively, dummy cells may have the same circular shape as that of the cells.

Figure 6:
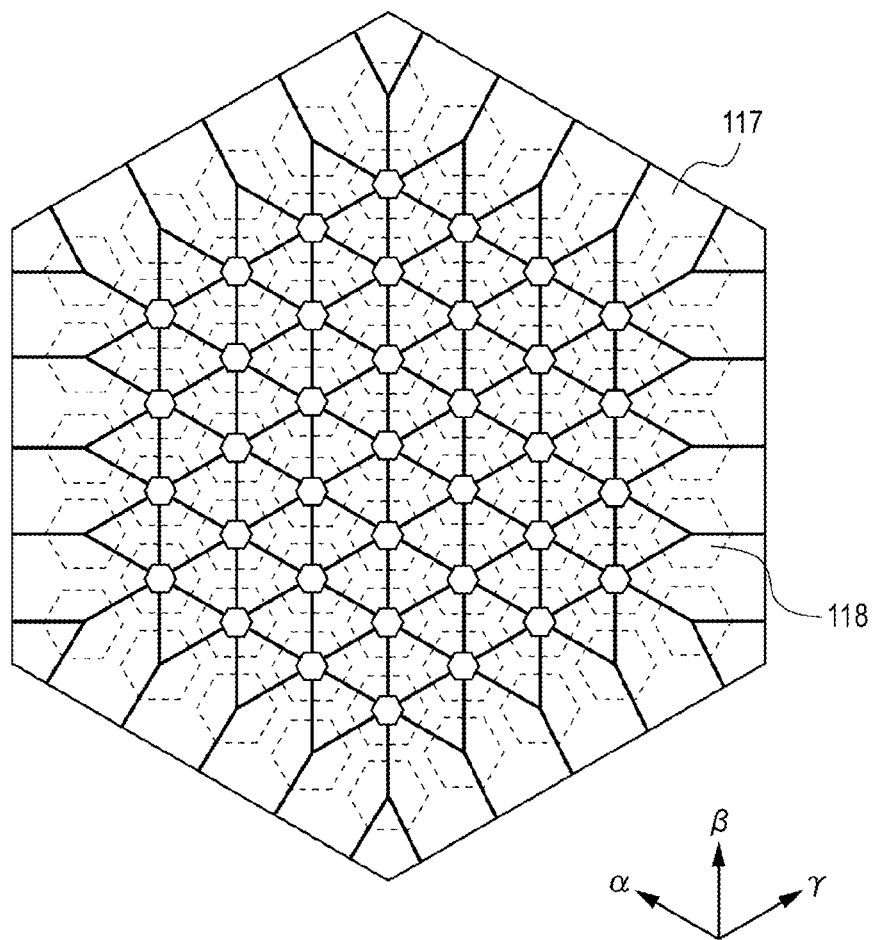
[FIG. 6]
Figure 7A:
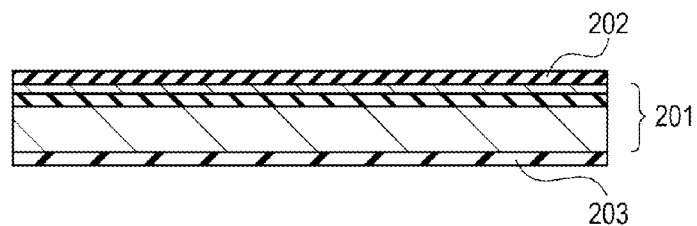
[FIG. 7A]
Figure 7B:
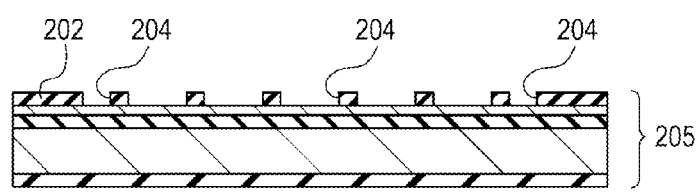
[FIG. 7B]
Figure 7C:
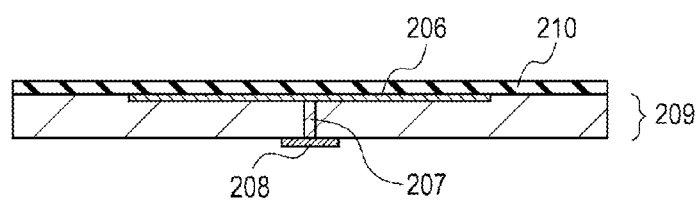
[FIG. 7C]
Figure 7D:
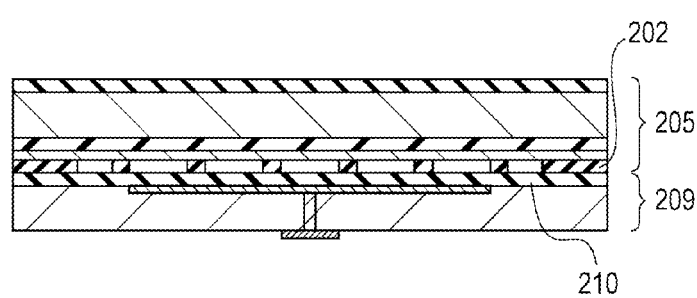
[FIG. 7D]
Figure 7E:
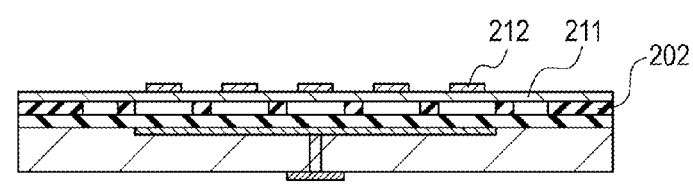
[FIG. 7E]
Figure 7F:
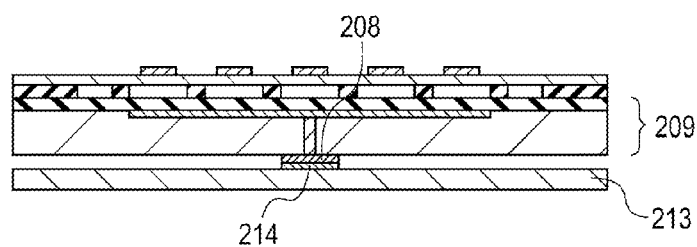
[FIG. 7F]

In an element 117 in which cells are arranged in a honeycomb pattern, as shown in FIG. 6, dummy cells 118 are arranged outside cells provided on the outermost periphery of the element 117 along three axes alpha, beta, and gamma in the figure.

Fifth Embodiment

With reference to FIGS. 7A to 7F, a description will be given of a production method for a CMUT including dummy cells having the same depth as that of cells, as in the above-described first embodiment. This production method is based on the CMUT production method disclosed in U.S. Pat. No. 6,958,255. FIGS. 7A to 7F correspond to the following steps (a) to (f), respectively.

(a) Silicon oxide layers 202 and 203 are respectively formed on opposite surfaces of a SOI (Silicon On Insulator) substrate 201.

(b) Through holes 204 are formed in portions of the silicon oxide layer 202 where cavities of cells and cavities of dummy cells are to be formed, thereby forming a device substrate 205.

(c) A silicon oxide layer 210 is formed on an upper surface of a through line substrate 209 including a lower electrode 206, a through line 207, and a pad 208.

(d) The portion of the silicon oxide layer 202 remaining on the device substrate 205 is joined to the silicon oxide layer 210 on the upper surface of the through line substrate 209.

(e) The layers other than the silicon oxide layer 202 of the device substrate 205 and a device layer 211 of the SOI substrate 201 are removed to form upper electrodes 212 on an upper surface of the device layer 211.

(f) The pad 208 on a lower surface of the through line substrate 209 is joined to a pad 214 on an upper surface of a circuit board 213.

Figure 8A:
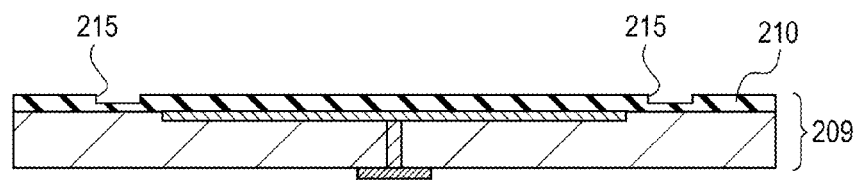
[FIG. 8A]
Figure 8B:
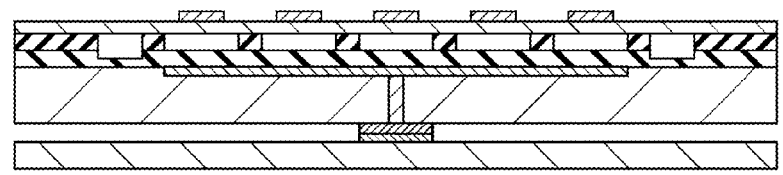
[FIG. 8B]

Since cavities of dummy cells are formed simultaneously with formation of cavities of cells in the above step (b), the CMUT of the present invention can be produced through the same number of steps as that adopted in the production method of the related art. By adding the following steps to the above-described production method, a CMUT in which the depth of cavities of dummy cells is larger than that of cells, as in the above-described second embodiment, can be produced. More specifically, after the device substrate 205 and the through line substrate 209 are formed through the above-described steps (a) to (c), recesses 215 having a depth equal to the difference between the desired depth of cavities of dummy cells and the depth of cavities of cells are formed in the silicon oxide layer 210 on the upper surface of the through line substrate 209, as shown in FIG. 8A. Then, steps similar to the above-described steps (d) to (f) are performed to produce a CMUT shown in FIG. 8B.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-330366, filed Dec. 25, 2008, which is hereby incorporated by reference herein in its entirety.

The invention claimed is:

1. An electromechanical transducer including an element, wherein the element comprises:
   a plurality of cells each including a first electrode and a second electrode provided with a cavity being disposed therebetween, the cells being electrically connected in parallel to form a unit; and
   a plurality of dummy cells provided around an outer periphery of the unit of the cells, the dummy cell not being electrically connected to the cells,
   wherein a depth of a cavity of each of the dummy cells is larger than a depth of the cavity of each of the cells.

2. The electromechanical transducer according to claim 1, wherein a plurality of the dummy cells are arranged from an inner peripheral side toward an outer peripheral side of the unit of the cells.

3. The electromechanical transducer according to claim 1, wherein a width of each of the dummy cells is 10% or more and 40% or less of a width of each of the cells.

4. A production method for an electromechanical transducer including an element having a plurality of cells each including a first electrode and a second electrode provided with a cavity being disposed therebetween, the cells being electrically connected in parallel to form a unit, wherein the production method comprises the step of:
forming a plurality of dummy cells around an outer periphery of the unit of the cells, the dummy cell not being electrically connected to the cells, wherein the dummy cells are formed such that a depth of a cavity of each of the dummy cells is larger than a depth of the cavity of each of the cells.

5. The production method according to claim 4, wherein the dummy cells are formed such that a width of a cavity of the dummy cell is smaller than a width of the cavity of each of the cells.

6. The production method according to claim 4, wherein the dummy cells are formed such that a plurality of the dummy cells are arranged from an inner peripheral side toward an outer peripheral side of the unit of the cells.

7. The production method according to claim 4, wherein the dummy cells are formed such that a width of each of the dummy cells is 10% or more and 40% or less of a width of each of the cells.

8. An electromechanical transducer including an element, wherein the element comprises:
a plurality of cells each including a first electrode and a second electrode provided with a cavity being disposed therebetween, the cells being electrically connected in parallel to form a unit; and
a plurality of dummy cells provided around an outer periphery of the unit of the cells, the dummy cell not being electrically connected to the cells,
wherein a shape of each of the dummy cells is different from a shape of each of the cells.

9. The electromechanical transducer according to claim 8, wherein a width of a cavity of the dummy cell is smaller than a width of the cavity of each of the cells.

10. The electromechanical transducer according to claim 8, wherein a depth of a cavity of each of the dummy cells is equal to a depth of the cavity of each of the cells.

11. The electromechanical transducer according to claim 8, wherein a depth of a cavity of each of the dummy cells is larger than a depth of the cavity of each of the cells.

12. The electromechanical transducer according to claim 8, wherein a plurality of the dummy cells are arranged from an inner peripheral side toward an outer peripheral side of the unit of the cells.

13. The electromechanical transducer according to claim 8, wherein a width of each of the dummy cells is 10% or more and 40% or less of a width of each of the cells.

14. An electromechanical transducer including an element, wherein the element comprises:
a plurality of cells each including a first electrode and a second electrode provided with a cavity being disposed therebetween, the cells being electrically connected in parallel to form a unit; and
a plurality of dummy cells each including an upper electrode and a bottom electrode provided with a cavity being disposed therebetween,
wherein the upper electrode of each of the dummy cells and the bottom electrode of each of the dummy cells are not electrically connected to the first electrode of each of the cells and the second electrode of each of the cells.

* * * * *